(12) United States Patent
Dollase et al.

(10) Patent No.: US 7,758,933 B2
(45) Date of Patent: Jul. 20, 2010

(54) ADHESIVE MATERIALS HAVING A HIGH REFRACTIVE INDEX BASED ON ACRYLATE BLOCK COPOLYMERS

(75) Inventors: Thilo Dollase, Hamburg (DE); Marc Husemann, Hamburg (DE)

(73) Assignee: teas SE, Hamburg (DE)

( * ) Notice: Subject to any disclaimer, the term of this patent is extended or adjusted under 35 U.S.C. 154(b) by 697 days.

(21) Appl. No.: 10/522,233

(22) PCT Filed: Jun. 24, 2003

(86) PCT No.: PCT/EP03/06614

§ 371 (c)(1),
(2), (4) Date: Aug. 18, 2005

(87) PCT Pub. No.: WO2004/015020

PCT Pub. Date: Feb. 19, 2004

(65) Prior Publication Data

US 2006/0057372 A1    Mar. 16, 2006

(30) Foreign Application Priority Data

Jul. 27, 2002 (DE) .............................. 102 34 246

(51) Int. Cl.
*B32B 27/30* (2006.01)
*C08F 293/00* (2006.01)

(52) U.S. Cl. .................. 428/1.55; 428/441; 525/89

(58) Field of Classification Search ............... 428/1.55, 428/441; 525/89
See application file for complete search history.

(56) References Cited

U.S. PATENT DOCUMENTS

| | | | |
|---|---|---|---|
| 3,140,340 A | 7/1964 | Weber | |
| 3,648,348 A | 3/1972 | Freimuth | 29/200 B |
| 4,576,850 A | 3/1986 | Martens | 428/156 |
| 4,581,429 A | 4/1986 | Solomon et al. | 526/220 |
| 4,588,258 A | 5/1986 | Hoopman | 350/103 |
| 4,775,219 A | 10/1988 | Appeldorn et al. | 350/103 |
| 4,801,193 A | 1/1989 | Martin | 350/103 |
| 4,805,984 A | 2/1989 | Cobb, Jr. | 350/96.28 |
| 4,874,671 A | 10/1989 | Tahara et al. | 428/447 |
| 4,895,428 A | 1/1990 | Nelson et al. | 350/103 |
| 4,906,070 A | 3/1990 | Cobb, Jr. | 350/286 |
| 4,938,563 A | 7/1990 | Nelson et al. | 350/103 |
| 5,056,892 A | 10/1991 | Cobb, Jr. | 359/831 |
| 5,138,488 A | 8/1992 | Szczech | 359/529 |
| 5,175,030 A | 12/1992 | Lu et al. | 428/30 |
| 5,183,597 A | 2/1993 | Lu | 264/1.4 |
| 5,639,530 A | 6/1997 | Miron et al. | 428/40.1 |
| 5,763,548 A | 6/1998 | Matyjaszewski et al. | 526/135 |
| 5,767,210 A | 6/1998 | Lecomte et al. | 526/166 |
| 5,789,487 A | 8/1998 | Matyjaszewski et al. | 525/301 |
| 5,811,500 A | 9/1998 | Dubois et al. | 526/145 |
| 5,854,364 A | 12/1998 | Senninger et al. | 526/192 |
| 5,919,871 A | 7/1999 | Nicol et al. | 525/333.8 |
| 6,114,482 A | 9/2000 | Senninger et al. | 526/172 |
| 6,266,166 B1 | 7/2001 | Katsumata et al. | 359/3 |
| 6,281,311 B1 | 8/2001 | Lai et al. | 526/220 |
| 6,383,620 B1 * | 5/2002 | Aoyama et al. | 428/212 |
| 6,432,475 B1 | 8/2002 | Yamamoto et al. | 427/208.4 |
| 6,479,608 B1 | 11/2002 | Nesvadba et al. | 526/328.5 |
| 6,551,439 B1 * | 4/2003 | Hill et al. | 156/273.3 |
| 6,642,318 B1 | 11/2003 | Chiefari et al. | 525/261 |
| 2003/0013790 A1 | 1/2003 | Husemann et al. | |
| 2003/0096075 A1 | 5/2003 | Dollase et al. | 428/40.1 |
| 2003/0114582 A1 | 6/2003 | Husemann et al. | 524/558 |
| 2003/0119970 A1 | 6/2003 | Husemann et al. | 524/505 |
| 2003/0190467 A1 | 10/2003 | Husemann et al. | 428/354 |
| 2004/0006151 A1 | 1/2004 | Husemann et al. | 522/134 |
| 2004/0171777 A1 | 9/2004 | Le et al. | 526/286 |
| 2004/0202881 A1 * | 10/2004 | Everaerts et al. | 428/500 |
| 2004/0249073 A1 * | 12/2004 | Takahashi et al. | 525/71 |

FOREIGN PATENT DOCUMENTS

DE    199 49 352    4/2000

(Continued)

OTHER PUBLICATIONS

U.S. Appl. No. 10/098,352, filed Mar. 18, 2002, Strobl.

*Primary Examiner*—Jeffrey C Mullis
(74) *Attorney, Agent, or Firm*—Norris McLaughlin & Marcus, PA

(57) ABSTRACT

A pressure-sensitive adhesive based on at least 50% of one or more block copolymers, at least one block copolymer being composed at least in part on the basis of (meth)acrylic acid derivatives, the at least one block copolymer comprising at least the unit P(A)-P(B)-P(A), comprising at least one polymer block P(B) and at least two polymer blocks P(A), where P(A) independently of one another represent homopolymer or copolymer blocks made up of monomers of group A, the (co)polymer blocks P(A) each having a softening temperature in the range from 0° C. to +175° C., P(B) represents a homopolymer or copolymer block comprising monomers of group B, the (co)polymer block P(B) having a softening temperature in the range from −130° C. to +10° C., and the (co)polymer blocks P(A) and P(B) are not homogeneously miscible with one another at 25° C., characterized in that the adhesive has a refractive index $n_{d,a}$ of $n_{d,a} \geq 1.52$ at 25° C., at least one of the (co)polymer blocks P(A) have a refractive index $n_{d,A}$ of $n_{d,A} \geq 1.58$ at 25° C., and the (co)polymer block P(B) has a refractive index $n_{d,B}$ of $n_{d,B} \geq 1.43$ at 25° C.

10 Claims, No Drawings

FOREIGN PATENT DOCUMENTS

| | | |
|---|---|---|
| DE | 100 36 803 | 2/2002 |
| DE | 100 36 804 | 2/2002 |
| DE | 10036802 | 2/2002 |
| DE | 10036804 * | 2/2002 |
| EP | 0 735 052 | 10/1996 |
| EP | 0 824 110 | 2/1998 |
| EP | 0 824 111 | 2/1998 |
| EP | 0 826 698 | 3/1998 |
| EP | 0 841 346 | 5/1998 |
| EP | 0 850 957 | 7/1998 |
| EP | 1008640 | 6/2000 |
| EP | 1 312 658 | 5/2003 |
| EP | 1308493 | 5/2003 |
| JP | 2001 115124 | 4/2001 |
| JP | 2001 288442 | 10/2001 |
| JP | 2003 041223 | 2/2003 |
| JP | 2003 055630 | 2/2003 |
| JP | 2003 096421 | 4/2003 |
| WO | WO 96/24620 | 8/1996 |
| WO | WO 98/01478 | 1/1998 |
| WO | WO 98/13392 | 4/1998 |
| WO | WO 98/44008 | 10/1998 |
| WO | WO 99/31144 | 6/1999 |
| WO | 02 10309 | 2/2002 |
| WO | WO 02/10307 | 2/2002 |
| WO | WO 0210308 | 2/2002 |
| WO | WO 03/000794 | 1/2003 |

* cited by examiner

ADHESIVE MATERIALS HAVING A HIGH REFRACTIVE INDEX BASED ON ACRYLATE BLOCK COPOLYMERS

This is a 371 of PCT/EP2003/006614 filed 24 Jun. 2003 (international filing date).

The invention relates to pressure-sensitive adhesive (PSAs) based on one or more block copolymers, the block copolymer/s being composed at least in part on the basis of (meth)acrylic acid derivatives, the block copolymer/s comprising the unit P(A)-P(B)-P(A), comprising at least one polymer block P(B) and at least two polymer blocks P(A), where P(A) independently of one another represent homopolymer or copolymer blocks made up of monomers of group A, the (co)polymer blocks P(A) each having a softening temperature in the range from 0° C. to +175° C., and, moreover, P(B) represents a homopolymer or copolymer block comprising monomers of group B, the (co)polymer block P(B) having a softening temperature in the range from −130° C. to +10° C., and, moreover, the (co)polymer blocks P(A) and P(B) are not homogeneously miscible with one another at 25° C. The invention further relates to the use of such PSAs.

BACKGROUND OF THE INVENTION

In the conception and design of optical components it is necessary to take account of the interaction of the materials used with the nature of the irradiated light. In one derived version the law of conservation of energy takes the form $$T(\lambda)+p(\lambda)+a(\lambda)=1,$$

where $T(\lambda)$ describes the fraction of light transmitted, $p(\lambda)$ the fraction of light reflected, and $a(\lambda)$ the fraction of light absorbed ($\lambda$: wavelength), and where the total intensity of the irradiated light has been normalized to 1. Depending on the application to which the optical component is put the task is to optimize individual terms among these three and to suppress the others in each case. Optical components designed for transmission ought to feature values for $T(\lambda)$ of close to 1. This is achieved by reducing the value of $p(\lambda)$ and $a(\lambda)$. PSAs based on acrylate copolymer and acrylate block copolymer normally have no significant absorption in the visible range, i.e., in the wavelength range between 400 nm and 700 nm. This can be readily ascertained by measurements with a UV-Vis spectrophotometer. The factor of particular interest, therefore, is $p(\lambda)$. Reflection is an interfacial phenomenon which depends on the refractive indices $n_{d,i}$ of two phases i in contact, according to the Fresnel equation $$\rho(\lambda) = \left(\frac{n_{d,2} - n_{d,1}}{n_{d,2} + n_{d,1}}\right)^2.$$

For the case of isorefractive materials, for which $n_{d,2}=n_{d,1}$, $p(\lambda)=0$. This explains the need to adapt the refractive index of a PSA that is to be used for optical components to those of the materials to be bonded. Typical values for a variety of such materials are set out in Table 1.

TABLE 1

| Material | Refractive index $n_d$ |
| --- | --- |
| Quartz glass | 1.458 |
| Borkron (BK7) | 1.514 |
| Borkron | 1.518 |
| Flint | 1.620 |

(Source: Pedrotti, Pedrotti, Bausch, Schmidt, Optik, 1996, Prentice-Hall, Munich. Data for $\lambda$ = 588 nm)

One concrete application to the bonding of an optical component is the bonding of optically active films for liquid-crystal-based display modules (known as LC displays), which significantly enlarge the angle of vision of the viewer. The attachment of such films is subject to stringent requirements. For instance, the adhesive ought to be highly transparent, so that the luminance of the LC display is only slightly reduced. This can be achieved, in accordance with the exposition above, by minimizing the fractions of absorbed and reflected light. It is therefore necessary to adapt the refractive index of the adhesive to that of the optical component to be joined.

Besides the adhesive bonding of optically active films to LC displays, however, there also exist a multiplicity of other applications, including those, for example, for the eye sector, which impose additional requirements on the adhesive.

Generally speaking it is possible, for the purpose of adhesive bonding, to use liquid adhesives (obtainable, for example, from Norland), which cure to form a solid bond. The disadvantage of liquid adhesives, however, is that, first, the glass or the optical film to be bonded comes into contact with solvents, something which in certain cases ought to be avoided. Additionally, an inherent disadvantage of liquid adhesives as compared with pressure-sensitive adhesives is that they require a lot of time for the drying and curing process.

As a result of their inherent tackiness, PSAs must possess a relatively low glass transition temperature. This limits the aromatics fraction and hence the maximum refractive index. There nevertheless exists a variety of types of PSA which attain very high refractive indices. Silicone rubbers are extremely suitable here (U.S. Pat. No. 4,874,671), but are frequently ruled out of use on cost grounds.

In U.S. Pat. No. 5,639,530, furthermore, styrene-dienes, block copolymers, are used for bonding reflective materials. U.S. Pat. No. 6,266,166 uses a pressure-sensitive acrylate adhesive tape to produce holograms. There, by addition of a highly transparent resin equipped with a high refractive index, the refractive index is raised to about 1.52. A disadvantage again, however, is the addition of resin, which significantly impairs the fogging behavior of the acrylate PSA. The same is true of the other additions too, such as aromatics or halogen compounds, for example.

It is an object of the invention to provide high-transparency pressure-sensitive adhesives having good adhesive properties on the basis of a large selection of acrylate-based monomers, the pressure-sensitive adhesives featuring, in particular, low fogging and/or outgassing behavior.

SUMMARY OF THE INVENTION

This object can be achieved, surprisingly and unforeseeably, through the preparation of pressure-sensitive adhesives based on block copolymer, in which individual polymer blocks and/or copolymer blocks have different refractive indices.

The invention accordingly provides pressure-sensitive adhesives based on one or more block copolymers, at least one block copolymer being composed at least in part on the basis of (meth)acrylic acid derivatives, the at least one block copolymer comprising at least the unit P(A)-P(B)-P(A), comprising at least one polymer block P(B) and at least two polymer blocks P(A), where P(A) independently of one another represent homopolymer or copolymer blocks made up at least to 75% by weight of monomers of group A, the (co)polymer blocks P(A) each having a softening temperature in the range from 0° C. to +175° C., P(B) represents a homopolymer or copolymer block comprising monomers of group B, the (co)polymer block P(B) having a softening temperature in the range from −130° C. to +10° C., and the (co)polymer blocks P(A) and P(B) are not homogeneously miscible with one another at 25° C., characterized in that the adhesive has a refractive index $n_{d,a}$ of $n_{d,a} \geq 1.52$ at 25° C., at least one of the (co)polymer blocks P(A) have a refractive index $n_{d,A}$ of $n_{d,A} \geq 1.58$ at 25° C., and the (co)polymer block P(B) has a refractive index $n_{d,B}$ of $n_{d,B} \geq 1.43$ at 25° C.

Accordingly it is possible for the first time to direct with substantial freedom the refractive index of an acrylate PSA through the choice of the monomers prior to polymerization and through a suitably chosen mode of polymerization (namely, by preparing block copolymers) and, in doing so, to obtain sufficiently high refractive indices without having to accept detractions from the desired PSA properties of the product. The invention affords the advantage of not having to rely on admixture of further components in order to achieve a desired refractive index but instead being able to have a free choice of the inclusion of such components as a function of the desired PSA properties.

By means of the PSAs of the invention it is therefore possible to utilize a large number of monomers to synthesize a high-refractive-index PSA, thereby allowing a broad palette of PSA properties to be set by means of the chemical composition; additionally the advantage arises that highly cohesive PSA layers can be produced without additional crosslinking steps in the process.

DETAILED DESCRIPTION

For the invention it can be of particular advantage if all the (co)polymer blocks P(A) each have a refractive index $n_{d,A}$ of $n_{d,A} \geq 1.58$ at 25° C.

In the sense of the invention it is further of advantage if the block copolymer or copolymers are present in the PSA at a level of at least 50% by weight.

The refractive index $n_d$ is defined according to Snell's law of refraction and depends on the wavelength of the irradiated light and on the temperature. For the purposes of this text it is understood to be the value which is measured at T=20° C. with white light (λ=550 nm±150 nm).

In the further text the polymer blocks P(A) are also referred to as hard blocks and the polymer blocks P(B) as elastomer blocks.

By softening temperature is meant the glass transition temperature in the case of amorphous systems and the melting temperature in the case of semicrystalline systems. Glass temperatures are reported as results from quasi steady-state methods such as differential scanning calometry (DSC), for example.

PSAs which have proven particularly advantageous in the sense of the invention are those which possess a refractive index $n_d$ of not less than 1.52 and for which the structure of the block copolymer/block copolymers can be described by one or more of the following general formulae:

$$P(A)\text{-}P(B)\text{-}P(A) \qquad (I)$$

$$P(B)\text{-}P(A)\text{-}P(B)\text{-}P(A)\text{-}P(B) \qquad (II)$$

$$[P(A)\text{-}P(B)]_n X \qquad (III)$$

$$[P(A)\text{-}P(B)]_n X [P(A)]_m \qquad (IV),$$

where n=3 to 12, m=3 to 12 and X is a polyfunctional branching unit, i.e., a chemical structural element via which different polymer arms are linked to one another, where, further, the polymer blocks P(A) independently of one another represent homopolymer or copolymer blocks comprising at least 75% by weight of monomers of group A, the polymer blocks P(A) each having a softening temperature in the range from 0° C. to +175° C. and possessing a refractive index $n_{d,A}$ of not less than 1.58, and where the polymer blocks P(B) independent of one another represent homopolymer or copolymer blocks comprising monomers of group B, the polymer blocks P(B) each having a softening temperature in the range from −130° C. to +10° C. and possessing a refractive index $n_{d,B}$ of not less than 1.43.

The polymer blocks P(A) as described in the main claim or in the advantageous embodiments can be polymer chains of a single variety of monomer from group A or can be copolymers of monomers of different structures from group A; where appropriate they can be copolymers of at least 75% by weight of monomers of group A and up to 25% by weight of monomers of group B. The monomers used from group A may vary in particular in their chemical structure and/or in the side chain length. The polymer blocks therefore cover the range between fully homogeneous polymers, via polymers formed from monomers of the same chemical parent structure but differing in chain length, and polymers with the same number of carbons but differing in isomerism, through to randomly polymerized blocks of monomers of different length with different isomerism from group A. The same is true of the polymer blocks P(B) in respect of the monomers of group B.

For the purposes of this text the term "polymer blocks" is therefore intended to include not only homopolymer blocks but also copolymer blocks, unless specified otherwise in a specific case.

The unit P(A)-P(B)-P(A) may be either symmetrical [corresponding to $P^1(A)\text{-}P(B)\text{-}P^2(A)$ where $P^1(A)=P^2(A)$] or asymmetrical [corresponding for instance to the formula $P^3(A)\text{-}P(B)\text{-}P^4(A)$ where $P^3(A)\approx P^4(A)$, but where both $P^3(A)$ and $P^4(A)$ are each polymer blocks as defined for P(A)] in construction.

An advantageous configuration is one in which the block copolymers have a symmetrical construction such that polymer blocks P(A) identical in chain length and/or chemical structure are present or such that polymer blocks P(B) identical in chain length and chemical structure are present.

$P^3(A)$ and $P^4(A)$ may differ in particular in their chemical composition and/or their chain length.

Starting monomers of group A for the polymer blocks P(A) are preferably selected such that the resulting polymer blocks P(A) are immiscible with the polymer blocks P(B) and, accordingly, microphase separation occurs.

Advantageously the typical domain sizes are smaller than 400 nm, more preferably smaller than 200 nm.

Suitable monomers of group A contain a C=C double bond, in particular one or more vinyl groups in the true sense and/or vinylic groups. Vinylic groups referred to here are groups wherein some or all of the hydrogen atoms of the unsaturated carbon atoms have been substituted by organic and/or inorganic radicals. In this sense, acrylic acid, methacrylic acid and/or derivatives thereof are also included among the compounds containing vinylic groups. The above compounds are referred to collectively below as vinyl compounds. Advantageous examples of compounds which can be used as monomers of group A are vinylaromatics which as polymers possess a refractive index of not less than 1.58 at 25° C. Specific monomers, whose recitation is only by way of example, however, include styrene, α-methylstyrene, o-methylstyrene, o-methoxystyrene, p-methoxystyrene or 4-methoxy-2-methylstyrene, for example.

As monomers of group A it is further possible with advantage to use acrylates, such as acrylate-terminated polystyrene or α-bromophenyl acrylate, for example, and/or methacrylates, such as methacrylate-terminated polystyrene (for example, Methacromer PS 12 from Polymer Chemistry Innovations), 1,2-diphenylethyl methacrylate, diphenylmethyl methacrylate, o-chlorobenzyl methacrylate or p-bromophenyl methacrylate, and/or acrylamides, such as N-benzylmethacrylamide.

The monomers can also be used in mixtures with one another. Since monomer mixtures as well can be used to obtain a refractive index $n_d$ of not less than 1.58 for the polymer blocks P(A), it is also possible for one or more components to possess, in the form of a homopolymer, a refractive index $n_d$ of less than 1.58 at 25° C. Specific examples of such comonomers, without making any claim to completeness, are o-cresyl methacrylate, phenyl methacrylate, benzyl methacrylate or o-methoxyphenyl methacrylate.

Additionally, however, the polymer blocks P(A) may also be constructed as copolymers such that they can consist to the extent of at least 75% of the above monomers of group A or of a mixture of these monomers, leading to a high softening temperature, but may also contain, at up to 25%, monomers of group B, leading to a lowering of the softening temperature of the polymer block P(A). In this context mention may be made, by way of example, of alkyl acrylates, which are defined in accordance with the structure B1 and the comments made in relation thereto.

Monomers of group B for the elastomer block P(B) are advantageously likewise chosen such that they contain C=C double bonds (especially vinyl groups and vinylic groups), with the proviso that the polymer block P(B) has a refractive index $n_{d,B}$ of at least 1.43. As monomers of group B use is made advantageously of acrylate monomers. For this purpose it is possible in principle to use all of the acrylate compounds that are familiar to the skilled worker and are suitable for synthesizing polymers. It is preferred to choose those monomers which, alone or in combination with one or more further monomers, result in glass transition temperatures of less than +10° C. for the polymer block P(B). Correspondingly it is possible with preference to choose vinyl monomers.

For the preparation of the polymer blocks P(B) it is advantageous to use from 75% to 100% by weight of acrylic and/or methacrylic acid derivatives of the general structure

  (B1)

where $R^1$=H or $CH_3$ and $R^2$=H or linear, branched or cyclic, saturated or unsaturated hydrocarbon chains having 1 to 30, in particular having 4 to 18, carbon atoms and up to 25% by weight of monomers (B2) from the vinyl compounds group, these monomers B2 favorably containing functional groups.

The weight percentages above add up preferably to 100%, although the total may also amount to less than 100% by weight, if other (polymerizable) monomers are present.

Acrylic monomers of group B which are used very preferably in the sense of compound B1 as components for polymer blocks P(B) include acrylic and methacrylic esters with alkyl, alkenyl and/or alkynyl groups consisting of 4 to 18 carbon atoms. Specific examples of corresponding compounds, without wishing to be restricted by this recitation, include n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, branched isomers thereof, such as 2-ethylhexyl acrylate and isooctyl acrylate, and also cyclic monomers, such as cyclohexyl or norbornyl acrylate and isobornyl acrylate, for example.

In addition it is possible, optionally, to use vinyl monomers from the following groups as monomers B2 for polymer blocks P(B): vinyl esters, vinyl ethers, vinyl halides, vinylidene halides, and also vinyl compounds containing aromatic rings and heterocycles in a position. Here again mention may be made, by way of example, of selected monomers which can be used in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile.

As particularly preferred examples of monomers containing vinyl groups, in the sense of B2, for the elastomer block P(B) suitability is additionally possessed by hydroxyethyl acrylate, hydroxypropyl acrylate, hydroxyethyl methacrylate, hydroxypropyl methacrylate, N-methylolacrylamide, acrylic acid, methacrylic acid, allyl alcohol, maleic anhydride, itaconic anhydride, itaconic acid, benzoin acrylate, acrylated benzophenone, acrylamide and glycidyl methacrylate, to name but a few.

All monomers which are capable of being employed may likewise be used in a halogenated form.

In one preferred embodiment of the inventive PSAs having a refractive index of not less than 1.52 one or more of the polymer blocks contain one or more grafted-on side chains. The compounds in question may be compounds in which the side chains are obtained by graft-from processes (polymerizational attachment of a side chain, starting from an existing polymer backbone) or by graft-to processes (attachment of polymer chains to a polymer backbone via polymer-analogous reactions).

For preparing block copolymers with side chains it is possible in particular to use, as macromonomers from groups A and B, monomers functionalized in such a way as to allow a graft-from process for the grafting-on of side chains. Particular mention may be made here of acrylate and methacrylate monomers which carry halogen functionalization or functionalization provided by other functional groups which permit, for example, an ATRP (atom transfer radical polymerization) process. In this context mention may also be made of the possibility of introducing side chains into the polymer chains in a targeted way via the addition of macromonomers during the polymerization.

In one specific embodiment of this invention the polymer blocks P(B) have had incorporated into them one or more functional groups which permit radiation-chemical crosslinking of the polymer blocks, in particular by means of UV irradiation or bombardment with rapid electrons. With this objective, monomer units of group B which can be used include, in particular, acrylic esters containing an unsaturated hydrocarbon radical having 3 to 18 carbon atoms and containing at least one carbon-carbon double bond. Suitable with particular advantage for acrylates modified with double bonds are allyl acrylate and acrylated cinnamates. Besides acrylic monomers it is also possible with great advantage, as monomers for the polymer block P(B), to use vinyl compounds containing double bonds which are not reactive during the (free-radical) polymerization of the polymer block P(B). Particularly preferred examples of such comonomers are isoprene and/or butadiene, and also chloroprene.

In a further embodiment of the inventive PSA, polymer blocks P(A) and/or P(B) are functionalized in such a way that a thermally initiated crosslinking can be carried out. As crosslinkers it is possible to choose favorably, among others: epoxides, aziridines, isocyanates, polycarbodiimides and metal chelates, to name but a few.

One preferred characteristic of the PSAs of the invention is that the molar mass $M_n$ (number average) of at least one of the block copolymers or, in the case of two or more block copolymers, of all the block copolymers in particular, is between about 10 000 and about 600 000 g/mol, preferably between 30 000 and 400 000 g/mol, more preferably between 50 000 g/mol and 300 000 g/mol.

The fraction of the polymer blocks P(A) is advantageously between 5 and 40 percent by weight of the overall block copolymer, preferably between 7.5 and 35 percent by weight, more preferably between 10 and 30 percent by weight. The polydispersity D of the block copolymer is preferably less than 3, as given by the ratio of mass-average $M_w$ to number-average $M_n$ in the molar mass distribution. In the case of two or more block copolymers in the PSA of the invention the above details concerning the fractions and the polydispersity D apply advantageously for at least one of the block copolymers but preferably for all of the block copolymers present.

In a further development of the invention the ratio $V_{A/B}[V_{A/B}=l_{P(A)}/l_{P(B)}]$ of the average chain lengths $l_{P(A)}$ of the polymer blocks P(A) to the chain lengths $l_{P(B)}$ of the polymer blocks P(B) is chosen such that the polymer blocks P(A) are present as a disperse phase ("domains") in a continuous matrix of the polymer blocks P(B), in particular as spherical or distortedly spherical or cylindrical domains. This is preferably the case at a polymer blocks P(A) content of less than about 25% by weight. The formation of hexagonally packed cylindrical domains of the polymer blocks P(A) is likewise possible in the inventive sense.

In further advantageous embodiments of the PSA of the invention said PSA comprises a blend of at least one diblock copolymer with at least one triblock copolymer, or at least one diblock copolymer with at least one star-shaped block copolymer, at least one triblock copolymer with at least one star-shaped block copolymer, preferably at least one of the aforementioned components, and advantageously all of the block copolymer components of the blend, constituting block copolymers in the sense of the definition of the main claim.

Particularly preferred embodiments of such blends are the following:

blends of the block copolymers comprising the sequence P(A)-P(B)-P(A), corresponding to the main claim, with diblock copolymers P(A)-P(B), where to prepare the corresponding polymer blocks P(A) and P(B) the same monomers as above can be used. It may further be of advantage to add polymers P'(A) and/or P'(B) to the PSA composed of the block copolymers, in particular of triblock copolymers (I), or to the PSA composed of a block copolymer/diblock copolymer blend, for the purpose of improving its properties.

Accordingly the invention further provides PSAs based on a blend of at least one block copolymer which has a refractive index $n_d$ at 25° C. of not less than 1.52 with a diblock copolymer P(A)-P(B), where the polymer blocks P(A) of the diblock copolymers independently of one another represent homopolymer or copolymer blocks of the monomers of group A, the polymer blocks P(A) of the diblock copolymers each having a softening temperature in the range from 0° C. to +175° C. and a refractive index $n_{d,A}$ of not less than 1.58, and where the polymer blocks P(B) of the diblock copolymers independently of one another represent homopolymer or copolymer blocks of the monomers of group B, the polymer blocks P(B) of the diblock copolymers each having a softening temperature in the range from −130° C. to +10° C. and a refractive index $n_{d,B}$ of not less than 1.43, and/or with polymers P'(A) and/or P'(B), where the polymers P'(A) represent homopolymer and/or copolymers of the monomers of group A, the polymers P'(A) each having a softening temperature in the range from 0° C. to +175° C. and a refractive index $n_{d,A'}$ of not less than 1.58, where the polymers P'(B) represent homopolymers and/or copolymers of the monomers of group B, the polymers P'(B) each having a softening temperature in the range from −130° C. to +10° C. and a refractive index $n_{d,B'}$ of not less than 1.43, and where the polymers P'(A) and P'(B) are preferably miscible with the polymer blocks P(A) and P(B), respectively, of the block copolymers corresponding to the main claim.

Where both polymers P'(A) and polymers P'(B) are admixed, they are advantageously chosen such that the polymers P'(A) and P'(B) are not homogeneously miscible with one another.

As monomers for the diblock copolymers P(A)-P(B), for the polymers P'(A) and P'(B), respectively, it is preferred to use the monomers of groups A and B already mentioned.

The diblock copolymers preferably have a molar mass $M_n$ (number average) of between 5000 and 600 000 g/mol, more preferably between 15 000 and 400 000 g/mol, very preferably between 30 000 and 300 000 g/mol. They advantageously possess a polydispersity $D=M_w/M_n$ of not more than 3. It is advantageous if the fraction of the polymer blocks P(A) in relation to the composition of the diblock copolymer is between 3% and 50% by weight, preferably between 5% and 35% by weight.

Typical use concentration of diblock copolymers in the blend amount to up to 250 parts by weight per 100 parts by weight of block copolymers corresponding to the main claim comprising the unit P(A)-P(B)-P(A). The polymers P'(A) and P'(B), respectively, may be constructed as homopolymers and also as copolymers. They are advantageously chosen, in accordance with the comments made above, such that they are compatible with the polymer blocks P(A) and P(B), respectively, (of the block copolymer corresponding to the main claim). The chain length of the polymers P'(A) and P'(B), respectively, is preferably chosen such that it does not exceed that of the polymer block which is preferably miscible or associable with it, and advantageously is 10% lower, very advantageously 20% lower, than said length. The B block can advantageously also be chosen such that its length does not exceed half of the block length of the B block of the triblock copolymer.

To prepare the block copolymers used in the PSAs of the invention it is possible in principle to use all polymerizations which proceed in accordance with a controlled-growth or living mechanism, including combinations of different controlled polymerization techniques. Without possessing any claim to completeness, mention may be made here, by way of example, besides anionic polymerization, of ATRP, nitroxide/TEMPO-controlled polymerization, or, more preferably, the RAFT process; in other words, particularly those processes which allow control over the block lengths, polymer architecture or else, but not necessarily, the tacticity of the polymer chain.

Free-radical polymerizations can be conducted in the presence of an organic solvent or in the presence of water, or in mixtures of organic solvents and/or organic solvents with water, or without solvent. It is preferred to use as little solvent as possible. Depending on conversion and temperature, the polymerization time for free-radical processes is typically between 4 and 72 h.

In the case of solution polymerization, the solvents used are preferably esters of saturated carboxylic acids (such as ethyl acetate), aliphatic hydrocarbons (such as n-hexane, n-heptane or cyclohexane), ketones (such as acetone or methyl ethyl ketone), special boiling point spirit, aromatic solvents such as toluene or xylene, or mixtures of the aforementioned solvents. For polymerization in aqueous media or in mixtures of organic and aqueous solvents, it is preferred to add emulsifiers and stabilizers for the polymerization.

Where a free-radical polymerization method is employed, as polymerization initiators it is of advantage to use customary radical-forming compounds such as, for example, peroxides, azo compounds, and peroxosulphates. Initiator mixtures also possess outstanding suitability.

In an advantageous procedure, radical stabilization is effected using nitroxides of type (NIT 1) or (NIT 2):

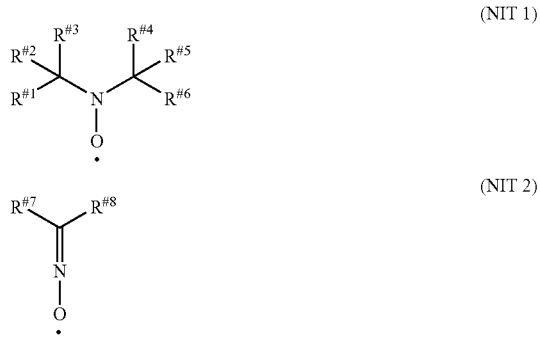

where $R^{\#1}, R^{\#2}, R^{\#3}, R^{\#4}, R^{\#5}, R^{\#6}, R^{\#7}, R^{\#8}$, independently of one another, denote the following compounds or atoms:
i) halides, such as chlorine, bromine or iodine
ii) linear, branched, cyclic, and heterocyclic hydrocarbons having from 1 to 20 carbon atoms, which can be saturated, unsaturated or aromatic,
iii) esters —COOR$^{\#9}$, alkoxides —OR$^{\#10}$ and/or phosphonates —PO(OR$^{\#11}$)$_2$, in which R$^{\#9}$, R$^{\#10}$ and/or R$^{\#11}$ stand for radicals from the group ii).

Compounds of the structure (NIT 1) or (NIT 2) may also be attached to polymer chains of any kind (primarily in the sense that at least one of the abovementioned radicals constitutes such a polymer chain) and can therefore be used as macroradicals or macroregulators to construct the block copolymers.

More preferred as controlled regulators for the polymerization of compounds of the following type are:
2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL
2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl
N-tert-butyl-1-phenyl-2-methyl propyl nitroxide
N-tert-butyl-1-(2-naphthyl)-2-methyl propyl nitroxide
N-tert-butyl-1-diethylphosphono-2,2-dimethyl propyl nitroxide
N-tert-butyl-1-dibenzylphosphono-2,2-dimethyl propyl nitroxide
N-(1-phenyl-2-methyl propyl)-1-diethylphosphono-1-methyl ethyl nitroxide
di-t-butyl nitroxide
diphenyl nitroxide
t-butyl-t-amyl nitroxide U.S. Pat. No. 4,581,429 A discloses a controlled-growth radical polymerization process initiated using a compound of the formula R'R"N—O—Y in which Y is a free radical species which is able to polymerize unsaturated monomers. The reactions, however, generally have low conversions. The particular problem is the polymerization of acrylates: which proceeds only to very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process using very specific radical compounds such as, for example, phosphorus-containing nitroxides which are based on imidazolidine. WO 98/44008 A1 discloses specific nitroxyls based on morpholines, piperazinones, and piperazinediones. DE 199 49 352 A1 describes heterocyclic alkoxyamines as regulators in controlled-growth radical polymerizations. Corresponding further developments of the alkoxyamines and/or of the corresponding free nitroxides improve the efficiency for preparing polyacrylates (Hawker, contribution to the National Meeting of the American Chemical Society, Spring 1997; Husemann, contribution to the IUPAC World Polymer Meeting 1998, Gold Coast).

As a further controlled polymerization method, it is possible advantageously to use atom transfer radical polymerization (ATRP) to synthesize the block copolymers, with preferably monofunctional or difunctional secondary or tertiary halides being used as initiator and, to abstract the halide(s), complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The different possibilities of ATRP are also described in the documents U.S. Pat. No. 5,945,491 A, U.S. Pat. No. 5,854,364 A, and U.S. Pat. No. 5,789,487 A.

It is also possible with advantage to prepare the block copolymer used in accordance with the invention by means of an anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, in which Me is a metal from group I of the Periodic Table, such as lithium, sodium or potassium, for example, and $P_L(A)$ is a growing polymer block made up of the monomers A. The molar mass of the polymer block being prepared is determined by the ratio of initiator concentration to monomer concentration. In order to construct the block structure, first of all the monomers A are added for the construction of a polymer block P(A), then, by adding the monomers B, a polymer block P(B) is attached, and subsequently, by again adding monomers.A, a further polymer block P(A) is polymerized on, so as to form a triblock copolymer P(A)-P(B)-P(A). Alternatively, P(A)-P(B)-M can be coupled by means of a suitable difunctional compound. In this way, star-shaped multiblock copolymers of the formula (II) as well are obtainable.

Examples of suitable polymerization initiators include n-propyllithium, n-butyllithium, sec-butyllithium, 2-naphthyllithium, cyclohexyllithium, and octyllithium, but this enumeration makes no claim to completeness. Furthermore, initiators based on rare-earth element complexes are known for the polymerization of acrylates (Macromolecules, 1995, 28, 7886) and can be used here.

It is also possible, moreover, to use difunctional initiators, such as 1,1,4,4-tetraphenyl-1,4-dilithiobutane or 1,1,4,4-tetraphenyl-1,4-dilithioisobutane. Coinitiators may likewise be used. Suitable coinitiators include lithium halides, alkali metal alkoxides, and alkylaluminum compounds. In one very preferred version, the ligands and coinitiators are chosen so that acrylate monomers, such as n-butyl acrylate and 2-ethylhexyl acrylate, for example, can be polymerized directly and do not have to be generated in the polymer by transesterification with the corresponding alcohol.

A very preferred preparation process conducted is a variant of the RAFT polymerization (reversible addition-fragmentation chain transfer polymerization). The polymerization process is described in detail, for example, in the documents WO 98/01478 A1 and WO 99/31144 A1. Suitable with particular advantage for the preparation of triblock copolymers are trithiocarbonates of the general structure R'''—S—C(S)—S—R''' (Macro-molecules 2000, 33, 243-245), by means of which, in a first step, monomers for the end blocks P(A) are polymerized. Then, in a second step, the middle block P(B) is synthesized. Following the polymerization of the end blocks P(A), the reaction can be terminated and reinitiated. It is also possible to carry out polymerization sequentially without interrupting the reaction. In one very advantageous variant, for example, the trithiocarbonates (TTC 1) and (TTC 2) or the thio compounds (THI 1) and (THI 2) are used for the polymerization, it being possible for φ to be a phenyl ring which can be unfunctionalized or functionalized by alkyl or aryl substituents attached directly or via ester or ether bridges, or to be a cyano group, or to be a saturated or unsaturated aliphatic radical. The phenyl ring φ may optionally carry one or more polymer blocks, examples being polybutadiene, polyisoprene, polychloroprene or poly(meth)acrylate, which can be constructed in accordance with the definition of P(A) or P(B), or polystyrene, to name but a few. Functionalizations may, for example, be halogens, hydroxyl groups, epoxide groups, groups containing nitrogen or sulfur, with this list making no claim to completeness.

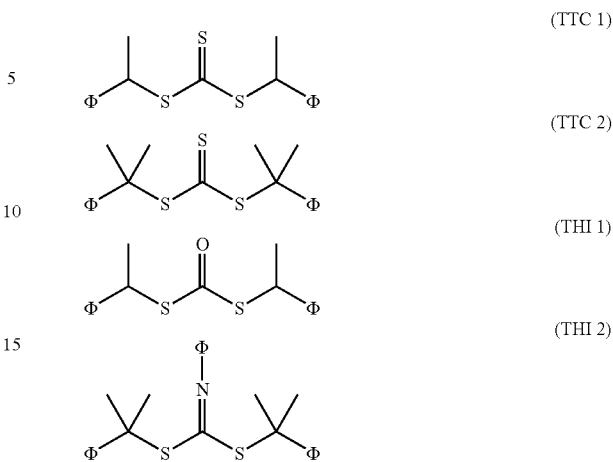

It is also possible to employ thioesters of the general structure

especially in order to prepare asymmetric systems. $R^{S1}$ and $R^{S2}$ can be selected independently of one another, and $R^{S1}$ can be a radical from one of the following groups i) to iv) and $R^{S2}$ a radical from one of the following groups i) to iii):

i) $C_1$- to $C_{18}$-alkyl, $C_2$- to $C_{18}$-alkenyl, $C_2$- to $C_{18}$-alkynyl, each linear or branched; aryl-, phenyl-, benzyl-, aliphatic and aromatic heterocycles.

ii) —$NH_2$, —NH—$R^{S3}$, —$NR^{S3}R^{S4}$, —NH—C(O)—$R^{S3}$, —$NR^{S3}$—C(O)—$R^{S4}$, —NH—C(S)—$R^{S3}$, —$NR^{S3}$G(S)—$R^{S4}$,

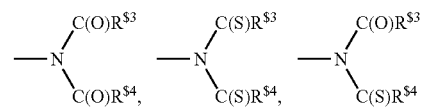

with $R^{S3}$ and $R^{S4}$ being radicals selected independently of one another from group i).

iii) —S—$R^{S5}$, —S—C(S)—$R^{S5}$, with $R^{S5}$ being able to be a radical from one of the groups i) or ii).

iv) —O—$R^{S6}$, —O—C(O)—$R^{S6}$, with $R^{S6}$ being able to be a radical chosen from one of the groups i) or ii).

In connection with the abovementioned polymerizations which proceed by controlled-growth free-radical mechanisms, it is preferred to use initiator systems which further comprise additional radical initiators for the polymerization, especially thermally decomposing radical-forming azo or peroxo initiators. In principle, however, all customary initiators known for acrylates are suitable for this purpose. The production of C-centred radicals is described in Houben-Weyl, Methoden der Organischen Chemie, Vol. E19a, p. 60 ff. These methods are employed preferentially. Examples of radical sources are peroxides, hydroperoxides, and azo compounds. A few nonexclusive examples of typical radical initiators that may be mentioned here include potassium peroxodisulphate, dibenzoyl peroxide, cumene hydroperoxide, cyclohexanone peroxide, cyclohexylsulphonyl acetyl peroxide, di-tert-butyl peroxide, azodiisobutyronitrile, diisopropyl percarbonate, tert-butyl peroctoate, and benzpinacol. In one very preferred variant, the radical initiator used is 1,1'-azobis (cyclohexylnitrile) (Vazo 88®, DuPont®) or 2,2-azobis(2-methylbutanenitrile) (Vazo 67®, DuPont®). Furthermore, it is also possible to use radical sources which release radicals only under UV irradiation.

In the conventional RAFT process, polymerization is generally carried out only to low conversions (WO 98/01478 A1), in order to obtain very narrow molecular weight distributions. Because of the low conversions, however, these polymers cannot be used as pressure sensitive adhesives and particularly not as hotmelt pressure sensitive adhesives, since the high residual monomer fraction adversely affects the adhesive technological properties, the residual monomers contaminate the solvent recyclate in the concentration process, and the corresponding self-adhesive tapes would exhibit very high outgassing.

The solvent is stripped off preferably in a concentrative extruder under reduced pressure, it being possible to use, for example, single-screw or twin-screw extruders for this purpose, which preferentially distill off the solvent in different or identical vacuum stages and which possess a feed preheater.

Tackifier resins may optionally be admixed to the block copolymer PSAs. In principle, it is possible to use all resins soluble in the corresponding polyacrylate middle block P(B). Suitable tackifier resins include rosin and rosin derivatives (rosin esters, including rosin derivatives stabilized by, for example, disproportionation or hydrogenation), polyterpene resins, terpene-phenolic resins, alkylphenol resins, and aliphatic, aromatic and aliphatic-aromatic hydrocarbon resins, to name but a few. Primarily, the resins chosen are those which are compatible preferentially with the elastomer block. The weight fraction of the resins in the block copolymer is typically up to 40% by weight, more preferably up to 30% by weight.

For special embodiments of the invention it is also possible to use resins compatible with the polymer block P(A).

It is also possible, optionally, to add plasticizers, fillers (e.g., fibers, carbon black, zinc oxide, titanium dioxide, chalk, solid or hollow glass beads, microbeads of other materials, silica, silicates), nucleators, blowing agents, compounding agents and/or aging inhibitors, in the form of primary and secondary antioxidants or in the form of light stabilizers, for example.

Generally, in connection with the additives, such as resins, auxiliaries and plasticizers, care should be taken to ensure that these do not impair the outgassing characteristics. The substances used should therefore preferably be substances which even under a high temperature load possess a very low volatility. When using additives and adjuvants it should be ensured that, in the case where a multiphase system arises, the typical domain sizes are smaller than 400 nm, preferably smaller than 200 nm.

The internal strength (cohesion) of the PSA is preferably produced by physical crosslinking of the polymer blocks P(A). The resulting physical crosslinking is typically thermoreversible. For irreversible crosslinking, the PSAs may additionally be crosslinked chemically. For this purpose, the acrylate block copolymer PSAs can optionally comprise compatible crosslinking substances. Examples of suitable crosslinkers include metal chelates, polyfunctional isocyanates, polyfunctional amines, and polyfunctional alcohols. Additionally, polyfunctional acrylates can be used with advantage as crosslinkers for actinic irradiation.

For the optional crosslinking with UV light, UV-absorbing photoinitiators are added to the polyacrylate-containing block copolymers employed in the systems of the invention. Useful photoinitiators which can be used to great effect are benzoin ethers, such as benzoin methyl ether and benzoin isopropyl ether, for example, substituted acetophenones, such as 2,2-diethoxyacetophenone (available as Irgacure 651 from Ciba Geigy®), 2,2-dimethoxy-2-phenyl-1-phenylethanone, dimethoxyhydroxyacetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime.

The abovementioned photoinitiators and others which can be used, including those of the Norrish I or Norrish II type, can contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, aminoketone, azobenzoin, thioxanthone, hexarylbisimidazole, triazine and/or fluorenone, it being possible for each of these radicals to be further substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Veriag, Munich 1995. For further details, consult Carroy et al. in "Chemistry and Technology of UV and EB Formulation for Coatings, Inks and Paints", Oldring (ed.), 1994, SITA, London.

In principle it is also possible to crosslink the pressure-sensitive adhesives used in accordance with the invention using electron beams. Typical irradiation devices which may be employed are linear cathode systems, scanner systems, and segmented cathode systems, in the case of electron beam accelerators. A detailed description of the state of the art, and the most important process parameters, can be found in Skelhorne, Electron Beam Processing, in Chemistry and Technology of UV and EB Formulation for Coatings, Inks and Paints, Vol. 1, 1991, SITA, London. The typical acceleration voltages are situated within the range between 50 kV and 500 kV, preferably between 80 kV and 300 kV. The scatter doses used range between 5 to 150 kGy, in particular between 20 and 100 kGy.

The PSAs of the invention can be used with great advantage for single-sidedly or double-sidedly adhesive-coated PSA systems; thus, for example, for pads, labels, adhesive strips, adhesive sheets, etc., it being possible for the PSA systems to be with or without backings and to be of one-ply, two-ply or multi-ply design.

The PSAs of the invention can be used to particularly outstanding effect for single- or double-sided adhesive tapes, including, in particular, reversible (residuelessly repartable) systems. Examples of the advantageous use of the PSA of the invention are indicated below.

The PSA tapes of the invention may in particular have the following construction:
a] single-layer adhesive sheets, consisting of one layer of a PSA of the invention
b] multilayer adhesive sheets, utilizing as adhesive layer, on one or both sides, at least one PSA of the invention.

a) Single-Layer Product Constructions

Because of the high cohesion of the acrylate block copolymers it is possible to produce acrylate block copolymer self-adhesive strips or sheets comprising a single layer a (FIG. 1) having a thickness of up to several millimeters. In view of the intrinsic UV stability, corresponding self-adhesive strips/sheets require very little if any light stabilizer. Embodiments with water-clear transparency and high light stability are therefore readily obtainable. The PSAs may be coated onto films which are familiar for PSA tapes, such as polyester, PET, PE, PP, BOPP, polyamide, polyimide, polyurethanes, PVC, onto nonwovens, onto foams or onto woven fabrics and woven films. To produce transfer tapes the PSAs of the invention are printed onto release paper (glassine, HDPE, LDPE). Additionally the backing materials may possess optical effects, e.g., texturing or coloration, or through holograms. A specific example are, e.g., retroflective systems, as described for example in U.S. Pat. No. 5,639,530. Further suitable backing materials for single-sided PSA tapes are described for example in U.S. Pat. No. 3,140,340, U.S. Pat. No. 3,648,348, U.S. Pat. No. 4,576,850, U.S. Pat. No. 4,588,258, U.S. Pat. No. 4,775,219, U.S. Pat. No. 4,801,193, U.S. Pat. No. 4,805,984, U.S. Pat. No. 4,895,428, U.S. Pat. No. 4,906,070, U.S. Pat. No. 4,938,563, U.S. Pat. No. 5,056,892, U.S. Pat. No. 5,138,488, U.S. Pat. No. 5,175,030 and U.S. Pat. No. 5,183,597. For the purposes of this specification the use of transparent backings is preferable, but not necessary.

b) Multilayer Constructions

Additionally it is possible to produce, based on the PSAs of the invention, multilayer self-adhesive strips/sheets, examples being two-layer, three-layer or else multilayer systems.

In the simplest version the PSA of the invention is used to construct a double-sided PSA tape, with the carrier material that can be used again being any of a very wide variety of films, such as polyester, PET, PE, PP, BOPP, polyamide, polyimide, polyurethanes or PVC. Additionally nonwovens, foams, woven fabrics or woven films can be used as carrier materials for double-sided coatings. To allow them to be rolled up as a PSA tape, the double-sided PSA tapes are preferably lined with a release paper. Suitable release papers include glassine, HDPE or LDPE liners, which in one preferred interpretation possess a graduated release. Additionally it is possible as carrier film and stabilizing film to make use, in turn, of films which likewise possess a high refractive index $n_d$ of not less than 1.52 at 25° C. In order to comply with certain optical effects the films may likewise be textured and/or colored.

The PSAs of the invention (especially on self-adhesive tapes) can be used with preference for bonding optically transparent substrates. Thus it is possible, for the outdoor sector, for example, to bond panes of glass, with the transparency being retained. This is the case even in the event of large temperature fluctuations, in particular at high temperatures, when the resin content of conventional PSAs causes them to exhibit fogging. In the electronics sector as well the PSAs of the invention can be used to great advantage. Here again the application requires low outgassing and no fogging, since these constituents can influence the electrical function. With great advantage the inventive PSAs and PSA tapes are used for adhesive bonding in displays.

Advantageous PSAs of the invention exhibit very low outgassing figures and an undetectable fogging. The invention accordingly further provides for the use of the PSAs of the invention for self-adhesive products, in particular for single- or double-sided self-adhesive tapes, wherein have an outgassing figure of not more than 250 μg/g, preferably of not more than 200 μg/g, very preferably of not more than 150 μg/g, measured by heating a sample area, measuring 40 cm², of a PET film coated (coat weight 50 g/m²) with the pressure-sensitive adhesive under atmospheric pressure at 100° C. for one hour and determining the volatile constituents via GC-MS (test D), and/or have a fogging value of not less than 98%, measured by heating a sample, measuring 50 cm² (coat weight 50 g/cm² on PET film), of a single-sided pressure-sensitive adhesive tape coated with the pressure-sensitive adhesive, under atmospheric pressure at 100° C. for three hours and detecting the precipitation, which deposits on a pane of glass, as the 600 reflectometer value in accordance with DIN 75201 variant A, the fogging value being reported as the ratio of this measurement to the 600 reflectometer value of the precipitation-free pane of glass, and expressed as a percentage (test G).

Very preferably the adhesive tapes coated with the adhesives also, in total, comply with these limiting values, and therefore have an outgassing figure of not more than not more than 250 μg/g, preferably not more than 200 μg/g, very preferably not more than 150 μg/g, and/or a fogging values of not less than 98%.

Test Methods

A. Refractive Index

The refractive index of the PSA was measured in a 25 μm film using the Optronic instrument from Krüss at 25° C. and with white light (λ=550 nm±150 nm) in accordance with the Abbe principle. The instrument was stabilized in terms of temperature by operating it in conjunction with a thermostat from Lauda.

B. Bond Strength

The peel strength (bond strength) was tested in accordance with PSTC-1. A 100 μm PSA layer is applied to a PET film 23 μm thick. A strip of this sample 2 cm wide is adhered to a steel plate by being rolled over back and forth three times using a 2 kg roller. The plate is clamped in and the self-adhesive strip is peeled off from its free end in a tensile testing machine under a peel angle of 180° and at a speed of 300 mm/min.

C. Gel Permeation Chromatography (GPC)

The mean molecular weight $M_w$ and $M_n$ and the polydispersity D were determined by means of gel permeation chromatography. The eluent used was THF containing 0.1% by volume trifluoroacetic acid. Measurement was made at 25° C. The pre-column used was PSS-SDV, 5μ, $10^3$ Å, ID 8.0 mm×50 mm. Separation was carried out using the columns PSS-SDV, 5μ, $10^3$ and also $10^5$ and $10^6$ each with ID 8.0 mm×300 mm. The sample concentration was 4 g/l, the flow rate 1.0 ml per minute. Measurement was carried out against polystyrene standards.

D. Outgassing Behavior

The adhesives were coated onto PET film by the hotmelt method. The coat weight was approximately 50 g/m². Before or after UV irradiation a sample area measuring about 40 cm² was cut from the swatch specimen, scattered with glass beads (diameter: 60-80 μm), rolled up and transferred to a 25 ml glass headspace vial. The sample was heated under atmospheric pressure at 100° C. for 1 h and finally the volatile constituents were injected from the vapor space into the GC.

The volatile constituents were determined via GC-MS. The following instruments were used:

GC: Hewlett Packard HP 5890 SERIES 11 MS: Hewlett Packard HP 5989 A

For the measurement a DB-5 column with a length of 60 m, an internal diameter of 0.25 mm and a film thickness of 1 μm was installed. Measurement took place with a temperature program of 50° C. (3 min)-150° C./min-260° C. (2 min). The carrier gas used was hydrogen (90 kPa) with a flow rate of 1 ml/min. The split ratio was 1:10. The test is passed if the amount of volatile fractions does not exceed 250 pg/g.

E. Light Stability

A PSA tape specimen, adhesive on one side and measuring 4×20 cm², is lined over half of its area with a strip of card and then irradiated using Osram Ultra Vitalux 300 W lamps at a distance of 50 cm for 300 h. Following irradiation, the strip of card is removed and the discoloration is assessed visually.

The test is passed if the test strips exhibit little or no different discolorations and the adhesive properties are retained.

F. Transmittance

The transmittance was measured in the wavelength range from 190 to 900 nm using a Uvikon 923 from Biotek Kontron on a sample film 100 µm thick, applied to 50 µm polyolefin film, with measurement taking place against an uncoated polyolefin film reference.

G. Fogging Test

The test takes place in accordance with DIN 75201, method A. The precise implementation of the experiments, together with the test apparatus to be used, is set out in detail in DIN 75201. The content of that standard should therefore be considered part of the disclosure content of this specification.

The sample (50 cm² of a PET film coated on one side with the PSA, coat weight 50 g/m²) is placed on the bottom of a spoutless glass beaker of fixed dimensions (corresponding to DIN 75201: outer diameter 90 mm, height 190 mm, wall thickness 3.2 mm). The beaker is covered with a glass plate, on which volatile constituents from the sample are able to condense. This glass plate is cooled.

The beaker thus prepared is placed for three hours in a bath thermostat at the test temperature of (100±0.3)OC. In the course of this operation a precipitate is deposited on the glass plate closing the container, and this precipitation alters the light transmittance of the glass plate.

The effect of the fogging precipitation on the glass plate is detected by measuring the 60° reflectometer values. The reference used here comprises the 60° reflectometer values of the same glass plate without precipitation, preferably cleaned carefully prior to the experiment.

The fogging value F according to DIN 75201 is the ratio, in percent, of the 60° reflectomer value of a glass plate with fogging precipitation to the 600 reflectometer value of the same glass plate without fogging precipitation. Accordingly a fogging value of 10 is synonymous with a remanent light transmittance of only 10% by the glass plate, and hence is a poor fogging value. Conversely, a fogging value of 100 is optimal, since there are no measurable evaporations and such an article can be referred to as fogging-free.

Test Specimen Production

Prepration of a RAFT Regulator:

The regulator bis-2,2'-phenylethyl trithiocarbonate (formula VIII) was prepared starting from 2-phenylethyl bromide using carbon disulfide and sodium hydroxide in accordance with instructions from Synth. Comm., 1988, 18 (13), 1531. Yield: 72%: ¹H-NMR (CDCl₃), δ: 7.20-7.40 ppm (m, 10H); 3.81 ppm (m, 1H); 3.71 ppm (m, 1H); 1.59 ppm (d, 3H); 1.53 ppm (d, 3H).

Preparation of Nitroxides:

(a) Preparation of the Difunctional Alkoxyamine (NIT 31:

Preparation took place in analogy to the experimental instructions from Journal of American Chemical Society, 1999, 121(16), 3904. The starting materials used were 1,4-divinylbenzene and nitroxide (NIT 4).

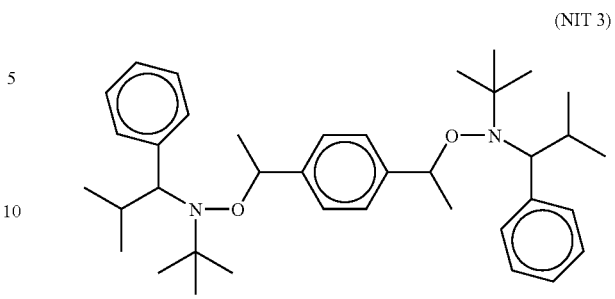

(NIT 3)

(b)Preparation of the nitroxide (NIT 4) (2.2.5-trimethyl-4-phenyl-3-azahexane-3-nitroxide):

Preparation took place in analogy to the experimental instructions from the Journal of American Chemical Society, 1999, 121(16), 3904.

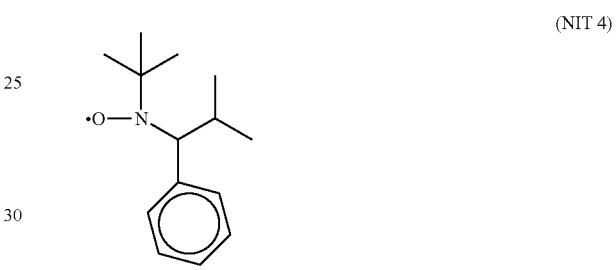

(NIT 4)

Preparation of Polystyrene (POS 1).

A 2 l reactor conventional for free-radical polymerization is charged under a nitrogen atmosphere with 362 g of styrene and 3.64 g of bis-2,2'-phenylethyl trithiocarbonate regulator. This initial charge is heated to an internal temperature of 110° C. and initiation is carried out using 0.15 g of Vazo 67® (DuPont). After a reaction time of 10 hours 100 g of toluene are added. After a reaction time of 24 hours initiation takes place with a further 0.1 g of Vazo 67® and polymerization for a further 24 hours. During the polymerization there is a marked rise in the viscosity. This is compensated by adding 150 g of toluene as a final dilution after 48 hours.

For purification the polymer was precipitated in methanol, filtered off on a frit and then dried in a vacuum drying cabinet.

Gel permeation chromatography (test C) against polystyrene standards gave results of $M_n$=29 300 g/mol and a polydispersity D of 1.2.

Preparation of Polystyrene (POS 2):

A 2 l reactor conventional for free-radical polymerization is charged under a nitrogen atmosphere with 180 g of styrene, 180 g of methacrylate-terminated polystyrene (Methacromer™ PS 12, Polymer Chemistry Innovations, $M_w$=11 000 to 13 000 g/mol) and 3.64 g of bis-2,2'-phenylethyl trithiocarbonate regulator. This initial charge is heated to an internal temperature of 110° C. and initiation is carried out using 0.15 g of Vazo 67® (DuPont). After a reaction time of 10 hours 100 g of toluene are added. After a reaction time of 24 hours initiation takes place with a further 0.1 g of Vazo 67® and polymerization for a further 24 hours. During the polymerization there is a marked rise in the viscosity. This is compensated by adding 150 g of toluene as a final dilution after 48 hours.

For purification the polymer was precipitated in methanol, filtered off on a frit and then dried in a vacuum drying cabinet.

Gel permeation chromatography (test C) against polystyrene standards gave results of $M_n$=35 200 g/mol and a polydispersity D of 1.5.

Example 1

A reactor conventional for free-radical polymerizations was charged with 120 g of trithiocarbonate-functionalized polystyrene (POS 1), 112 g of isobornyl acrylate, 168 g of 2-ethylhexyl acrylate and 0.12 g of Vazo 67® (DuPont). After argon had been passed through the reactor for 20 minutes and the reactor had been degassed twice it was heated to 70° C. with stirring and polymerization was carried out for 48 h.

To recover the polymer the batch was cooled to RT, the block copolymer was diluted to 50% with acetone/special-boiling-point spirit and then coated using a conventional knife coater onto a Saran-primed PET backing 23 µm thick, and release paper siliconized at 1.5 g/m², and then dried over 6 different stages at 60, 80, 100, 120 and 120 and 120° C. The average period of residence in each temperature zone was 80 seconds. The coat weight was 50 g/m² in each case.

Example 2

A reactor conventional for free-radical polymerizations was charged with 120 g of trithiocarbonate-functionalized polystyrene (POS 2), 112 g of isobornyl acrylate, 168 g of 2-ethylhexyl acrylate and 0.12 g of Vazo 67® (DuPont). After argon had been passed through the reactor for 20 minutes and the reactor had been degassed twice it was heated to 70° C. with stirring and polymerization was carried out for 48 h.

To recover the polymer the batch was cooled to RT, the block copolymer was diluted to 50% with acetone/special-boiling-point spirit and then coated using a conventional knife coater onto a Saran-primed PET backing 23 µm thick, and release paper siliconized at 1.5 g/m², and then dried over 6 different stages at 60, 80, 100, 120 and 120 and 120° C. The average period of residence in each temperature zone was 80 seconds. The coat weight was 50 g/m² in each case.

Example 3

General Procedure: A mixture of the alkoxyamine (NIT 3) and the nitroxide (NIT 4) (10 mol % with respect to alkoxyamine (NIT 3)) is mixed with the monomer B (for the subsequent polymer block P(B)), degassed a number of times with cooling to −78° C., and then heated under pressure at 110° C. in a closed vessel. After a reaction time of 36 hours the monomer A (for the subsequent polymer block P(A)) is added and polymerization is continued at this temperature for a further 24 hours.

In analogy to the general polymerization procedure 0.739 g of the difunctional initiator (NIT 3), 0.0287 g of the free nitroxide (NIT 4), 128 g of isobornyl acrylate and 192 g of 2-ethylhexyl acrylate were used as monomers (B) and 180 g of o-methoxystyrene were used as monomer (A). The polymer was isolated by cooling the batch to room temperature, dissolving the block copolymer in 750 ml of dichloromethane and then precipitating it from 6.0 l of methanol (cooled to −78° C.) with vigorous stirring. The precipitate was filtered off on a cooled frit.

The product obtained was concentrated in a vacuum drying cabinet at 10 torr and 45° C. for 12 hours.

The block copolymer was coated from the melt onto a Saran-primed PET backing film 23 µm thick or onto a release paper provided with a 1.5 g/m² silicone coat. Subsequent heating took place in an IR zone at 120° C. for 80 seconds. The coat weight was 50 g/m².

Results

Following production of the test specimens, first of all the refractive index was measured for all of Examples 1 to 3. This was done using the specimens inserted onto release paper. Table 2 summarizes the refractive indices measured. All values were determined at room temperature.

TABLE 2

| Example | Refractive index $n_d$ (test A) |
|---|---|
| 1 | 1.521 |
| 2 | 1.522 |
| 3 | 1.525 |

The values measured demonstrate that even without added resin all of the PSA Examples 1 to 3 achieve the required minimum value of $n_d$ not less than 1.52.

To determine the bond strength, the specimens coated onto PET film were subjected to a bond strength test, in order to show that these examples are in each case still inherently tacky. Measurement was made of the bond strength to steel. The values are summarized in Table 3.

TABLE 3

| Example | BS steel (test B) |
|---|---|
| 1 | 2.3 |
| 2 | 2.1 |
| 3 | 2.0 |

BS: instantaneous bond strength in N/cm

The values measured reveal that the PSA tapes of the invention possess pressure-sensitive adhesion properties with instantaneous bond strengths of around 2 N/cm.

For the "low fogging/outgassing behavior" field of use, the PSAs of the invention were subjected to an outgassing (test D) and to a fogging test (test G).

In the fogging test the constituents detected tend to be those which may precipitate on the glass and originate, for example, from additions of resin. No such additions are present, however, in the examples according to the invention, and so those examples exhibited no fogging.

For further testing, therefore, the outgassing behavior was determined via headspace GC (test D). The measurement values are set out in Table 4.

TABLE 4

| Example | Volatile fractions [µg/g] (test D) | Fogging value [%] (test G) |
|---|---|---|
| 1 | 45 | >99 |
| 2 | 73 | >99 |
| 3 | 120 | >99 |

The values measured are situated at a very low level, and hence Examples 1 to 3 exhibit a low outgassing behavior.

For use in outdoor applications, moreover, test E was carried out. In this test the PSA tape examples are irradiated for 300 hours with intensive incandescent lamps, which simulate sunlight exposure. The results are collated in Table 5.

TABLE 5

| Example | Light stability (test E) |
|---|---|
| 1 | passed |
| 2 | passed |
| 3 | passed |

The results demonstrate that the aging stabilities usual for polyacrylates are achieved. Accordingly, the PSAs of the invention can also be used for outdoor applications or for applications involving increased UV doses.

Additionally the light transmittance of the PSA tapes was determined, by means of test F. The transmittance was investigated in a range from 400 to 700 nm. The results are listed in Table 6.

TABLE 6

| Example | Transmittance (test F) |
|---|---|
| 1 | 92.6% |
| 2 | 93.4% |
| 3 | 95.1% |

All of the PSAs are colorless and in the visible range exhibit a very good and wavelength-independent transparency.

We claim:

1. A pressure-sensitive adhesive system comprising a first optically transparent substrate bonded to a second optically transparent substrate with pressure-sensitive adhesive, wherein the first optically transparent substrate is a film adapted to be used with a liquid-crystal-based display module and the second optically transparent substrate is the liquid-crystal-based display module, wherein the pressure-sensitive adhesive is based on at least 50% of one or more block copolymers, at least one block copolymer being composed at least in part on the basis of (meth)acrylic acid derivatives, the at least one block copolymer comprising at least the unit P(A)-P(B)-P(A), comprising at least one polymer block P(B) and at least two polymer blocks P(A), where
  P(A) independently of one another represent homopolymer or copolymer blocks made up of monomers of group A, the (co)polymer blocks P(A) each having a softening temperature in the range from 0° C. to +175° C.,
  P(B) represents a homopolymer or copolymer block comprising monomers of group B, the (co)polymer block P(B) having a softening temperature in the range from −130° C. to +10° C., and
  the (co)polymer blocks P(A) and P(B) are not homogeneously miscible with one another at 25° C.,
and wherein
  the pressure sensitive adhesive has a refractive index $n_{d,a}$ of $n_{d,a} \geq 1.52$ at 25° C.,
  at least one of the (co)polymer blocks P(A) has a refractive index $n_{d,A}$ of $n_{d,A} \geq 1.58$ at 25° C., and
  the (co)polymer block P(B) has a refractive index $n_{d,B}$ of $n_{d,B} \geq 1.43$ at 25° C.

2. The pressure-sensitive adhesive system of claim 1, wherein
  all the (co)polymer blocks P(A) have a refractive index $n_{d,A}$ of $n_{d,A} \geq 1.58$ at 25° C.

3. The pressure-sensitive adhesive system of claim 1, wherein one or more of the block copolymers are of one or more of the following formulae:

$$P(A)-P(B)-P(A) \quad (I)$$

$$P(B)-P(A)-P(B)-P(A)-P(B) \quad (II)$$

$$[P(A)-P(B)]nX \quad (III)$$

$$[P(A)-P(B)]nX[P(A)]m \quad (IV)$$

where
  n=3 to 12, m=3 to 12
  X represents a polyfunctional branching region,
  P(A) independently of one another represent homopolymer or copolymer blocks of monomers of group A, the (co)polymer blocks P(A) each having a softening temperature in the range from 0° C. to +175° C. and each having a refractive index $n_{d,A'}$ of $n_{d,A'} \geq 1.58$ at 25° C.,
  P(B) independently of one another represents homopolymer or copolymer blocks comprising monomers of group B, the (co)polymer blocks P(B) each having a softening temperature in the range from −130° C. to +10° C. and each having a refractive index $n_{d,B'}$ of $n_{d,B'} \geq 1.43$ at 25° C.

4. The pressure-sensitive adhesive system of claim 1, wherein
  the ratio of the chain lengths of the polymer blocks P(A) to those of the polymer blocks P(B) is chosen such that the polymer blocks P(A) are present as a disperse phase ("domains") in a continuous matrix of the polymer blocks P(B).

5. The pressure-sensitive adhesive system of claim 1, wherein the pressure-sensitive adhesive comprises a blend of
  at least one diblock copolymer with at least one triblock copolymer, or
  at least one diblock copolymer with at least one star-shaped block copolymer, or
  at least one triblock copolymer with at least one star-shaped block copolymer.

6. The pressure-sensitive adhesive system of claim 1, wherein the pressure-sensitive adhesive is admixed with one or more homopolymers and/or copolymers of the form P'(A) and/or P'(B), where
  the (co)polymers P'(A) each have a softening temperature in the range from 0° C. to +175° C. and each have a refractive index $n_{d,A'}$ of $n_{d,A'} \geq 1.58$ at 25° C.,
  the (co)polymers P'(B) each have a softening temperature in the range from −130° C. to +10° C. and each have a refractive index $n_{d,B'}$ of $n_{d,B'} \geq 1.43$ at 25° C.

7. The pressure-sensitive adhesive system of claim 1, wherein the pressure-sensitive adhesive has an outgassing value of not more than 250 pg/g, measured by heating a sample area, measuring 40 cm², of a PET film coated (coat weight 50 g/m²) with the pressure-sensitive adhesive under atmospheric pressure at 100° C. for one hour and determining the volatile constituents via GC-MS.

8. The pressure-sensitive adhesive system of claim 1, wherein the pressure-sensitive adhesive has a fogging value of not less than 98%, measured by heating a sample, measuring 50 cm², of a coated (coat weight 50 g/cm²) PE film with the pressure-sensitive adhesive, under atmospheric pressure at 100° C. for three hours and detecting the precipitation, which deposits on a pane of glass, as the 60° reflectometer value, the fogging value being reported as the ratio of this value to the 60° reflectometer value, of the precipitation-free pane of glass, and expressed as a percentage.

9. The pressure sensitive adhesive system of claim 4, wherein said disperse phase is in the form of spherical, distortedly spherical or cylindrical domains.

10. A pressure-sensitive adhesive system comprising a first optically transparent pane of glass bonded to a second optically transparent pane of glass with pressure-sensitive adhesive, wherein the pressure-sensitive adhesive is based on at least 50% of one or more block copolymers, at least one block copolymer being composed at least in part on the basis of (meth)acrylic acid derivatives, the at least one block copolymer comprising at least the unit P(A)-P(B)-P(A), comprising at least one polymer block P(B) and at least two polymer blocks P(A), where P(A) independently of one another represent homopolymer or copolymer blocks made up of monomers of group A, the (co)polymer blocks P(A) each having a softening temperature in the range from 0° C. to +175° C., P(B) represents a homopolymer or copolymer block comprising monomers of group B, the (co)polymer block P(B) having a softening temperature in the range from −130° C. to +10° C., and the (co)polymer blocks P(A) and P(B) are not homogeneously miscible with one another at 25° C., and wherein the pressure sensitive adhesive has a refractive index $n_{d,a}$ of $n_{d,a} \geq 1.52$ at 25° C., at least one of the (co)polymer blocks P(A) has a refractive index $n_{d,A}$ of $n_{d,A} \geq 1.58$ at 25° C., and the (co)polymer block P(B) has a refractive index $n_{d,B}$ of $n_{d,B} \geq 1.43$ at 25° C.

* * * * *